US011072384B2

(12) United States Patent
Li et al.

(10) Patent No.: US 11,072,384 B2
(45) Date of Patent: Jul. 27, 2021

(54) FIXED STRUCTURE FOR AN IDENTIFICATION MARK OF A BICYCLE

(71) Applicant: HANGZHOU QINGQI SCIENCE AND TECHNOLOGY CO., LTD., Zhejiang (CN)

(72) Inventors: Gang Li, Hangzhou (CN); Yamou Wu, Hangzhou (CN); Chunhua Yi, Hangzhou (CN)

(73) Assignee: HANGZHOU QINGQI SCIENCE AND TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/693,170

(22) Filed: Nov. 22, 2019

(65) Prior Publication Data

US 2020/0189681 A1   Jun. 18, 2020

Related U.S. Application Data

(63) Continuation of application No. PCT/CN2018/087879, filed on May 22, 2018.

(30) Foreign Application Priority Data

May 22, 2017 (CN) .......................... 201720574942.X

(51) Int. Cl.
*B62J 50/20* (2020.01)
*B62K 3/02* (2006.01)

(52) U.S. Cl.
CPC ................. *B62J 50/20* (2020.02); *B62K 3/02* (2013.01)

(58) Field of Classification Search
CPC . B62J 50/20; B62J 15/00; B62J 50/25; B62K 3/02; B62K 19/30; B60R 13/00;
(Continued)

(56) References Cited

U.S. PATENT DOCUMENTS 2,011,850 A * 8/1935 Clarke ....................... B62J 6/20
40/615
3,186,665 A * 6/1965 Cole ..................... B60R 13/105
248/475.1
(Continued)

FOREIGN PATENT DOCUMENTS

CN       200964155 Y    10/2007
CN       102602238 A     7/2012
(Continued)

OTHER PUBLICATIONS

International Search Report in PCT/CN2018/087879 dated Aug. 9, 2018, 6 pages.
(Continued)

*Primary Examiner* — Cassandra Davis
(74) *Attorney, Agent, or Firm* — Metis IP LLC

(57) ABSTRACT

The present disclosure relates to a fixed structure of an identification mark of a bicycle. The fixed structure may include a fixing plate and a cover board. The identification mark may be disposed between the fixing plate and the cover board, and the cover board is fixed on the fixing plate. The cover board may be transparent. By providing a fixing plate and a cover board, setting the cover board to be transparent, disposing the identification mark between the fixed board and the cover board, and fixing the cover board on the fixing board, a user may not only view the identification mark through the cover board, but also prevent the identification mark from being exposed to the wind and the sun to protect the identification mark, and prevent the identification mark from being artificially damaged, solving the technical problem that in the conventional technologies: since the identification mark is stuck on the surface of the body of the bicycle, the identification mark is easy to fall off after being exposed to the wind, the sun, and the rain, and sometimes the (Continued)

identification mark may be vandalized, thereby affecting the user's access of the bicycle sharing service.

14 Claims, 4 Drawing Sheets

(58) Field of Classification Search
CPC .... G09F 15/0025; G09F 21/04; G09F 21/042; G09F 21/048; G09F 21/049
See application file for complete search history.

(56) References Cited

U.S. PATENT DOCUMENTS

| | | | | | |
|---|---|---|---|---|---|
| 4,068,858 | A | * | 1/1978 | Harrison | B62K 21/12 280/279 |
| 5,018,291 | A | * | 5/1991 | Pasquale | G09F 1/12 40/584 |
| 5,619,815 | A | * | 4/1997 | Greene | B62J 11/00 280/288.4 |
| 7,748,150 | B2 | * | 7/2010 | Chuang | B60R 13/105 40/590 |
| 2006/0277803 | A1 | * | 12/2006 | Cotta | G09F 21/04 40/209 |
| 2007/0124972 | A1 | * | 6/2007 | Ratcliffe | G09F 7/00 40/591 |
| 2008/0084590 | A1 | | 4/2008 | Mack | |
| 2012/0227294 | A1 | * | 9/2012 | Weber | B60R 13/105 40/209 |
| 2014/0196331 | A1 | * | 7/2014 | Osiecki | G09F 21/04 40/594 |

FOREIGN PATENT DOCUMENTS

| | | |
|---|---|---|
| CN | 206826811 U | 1/2018 |
| JP | 2010228587 A | 10/2010 |
| WO | 2008074111 A2 | 6/2008 |

OTHER PUBLICATIONS

Written Opinion in PCT/CN2018/087879 dated Aug. 9, 2018, 8 pages.

* cited by examiner

FIXED STRUCTURE FOR AN IDENTIFICATION MARK OF A BICYCLE

CROSS-REFERENCE TO RELATED APPLICATIONS

This application is a Continuation of International Application No. PCT/CN2018/087879, filed on May 22, 2018, which is based on and claims priority to Chinese Application No. 201720574942.X filed on May 22, 2017, the entire contents of which are hereby incorporated by reference.

TECHNICAL FIELD

The present disclosure generally relates to the field of transportation, and more particularly, to a fixed structure of an identification mark of a bicycle.

BACKGROUND

Bicycle sharing has become a mode of transportation for most people. When a user uses a shared bicycle, it is necessary to go through one or more of the following operations: identifying a bicycle to be used, obtaining an identification mark of the bicycle, obtaining the service condition of the bicycle, and determining whether the bicycle can be used.

In conventional technologies, an identification mark of a bicycle is usually stuck on the surface of a body of the bicycle. After obtaining the information relating to the identification mark, the user can obtain the information relating to the bicycle and also obtain the right to use the bicycle.

However, since the identification mark is stuck on the surface of the body of the bicycle, the identification mark is easy to fall off after being exposed to the wind, the sun and the rain, and sometimes the identification mark may be vandalized, thereby affecting the user's access of the bicycle sharing service.

SUMMARY

The present disclosure provides a fixed structure of an identification mark of a bicycle that solves the technical problem that in the conventional technologies, that is, since the identification mark is stuck on the surface of a body of the bicycle, the identification mark is easy to fall off after being exposed to the wind, the sun and rain, and sometimes the identification mark may be vandalized, thereby affecting the user's access of the bicycle sharing service.

The present disclosure provides a fixed structure of an identification mark of a bicycle. The fixed structure may include a fixing plate and a cover board. The identification mark may be disposed between the fixing plate and the cover board. The cover board may be fixed on the fixing plate, wherein the cover board is transparent.

Preferably, the fixed structure may be disposed on a fender of the bicycle.

Preferably, one of the fixing plate and the cover board may be set with a buckle, and the other one of the fixing plate and the cover board may be set with a slot. The fixing plate and the cover board may be fixed together by putting the buckle into the slot.

Preferably, the slot may be disposed on the fixing plate, and the buckle may be disposed on the cover board.

Preferably, the number of the buckles may be two, and the buckles may be respectively disposed in the middle of two edges on a surface of the cover board opposite to the fixing plate. The number of the slots may also be two, and positions of the slots may correspond to positions of the snap joint.

Preferably, the cover board may further be set with a positioning column, and the fixing plate may further be set with a positioning hole. A location of the positioning column may correspond to a location of the positioning hole, and the positioning column may be fixed within the positioning hole.

Preferably, the number of the positioning columns may be four, and the positioning columns may be disposed on two sides of the buckle.

Preferably, the fixing plate may be set with a counterbore, and the cover board may be disposed within the counterbore.

Preferably, the fixing plate may be further set with a through hole connected to the counterbore, and a size of the through hole is less than the size of the counterbore.

The benefits of the present disclosure are as follows:

in the present disclosure, by providing a fixing plate and a cover board, setting the cover board to be transparent, disposing the identification mark between the fixed board and the cover board, and fixing the cover board on the fixing board, a user may not only view the identification mark through the cover board, but also prevent the identification mark from being exposed to the wind and the sun to protect the identification mark, and prevent the identification mark from being artificially damaged, solving the technical problem that in the conventional technologies: since the identification mark is stuck on the surface of the body of the bicycle, the identification mark is easy to fall off after being exposed to the wind, the sun, and the rain, and sometimes the identification mark may be vandalized, thereby affecting the user's access of the bicycle sharing service.

BRIEF DESCRIPTION OF THE DRAWINGS

In order to illustrate the technical solutions in the embodiments of the present disclosure or the prior art clearly, the drawings used in the description of the embodiments will be briefly described below. Obviously, the drawings in the following description are merely some examples of the present disclosure.

DETAILED DESCRIPTION

Some embodiments of the present disclosure provide a fixed structure of an identification mark of a bicycle, which solves the technical problem that in the conventional technologies: since the identification mark is generally stuck on the surface of the body of the bicycle, the identification mark is easy to fall off after being exposed to the wind, the sun, and the rain, and sometimes the identification mark may be vandalized, thereby affecting the user's access of the bicycle sharing service.

In order to solve the above technical problem, the technical solution in the embodiments of the present disclosure are as follows.

A fixed structure of an identification mark of a bicycle is provided. The fixed structure may include a fixing plate and a cover board. The identification mark may be disposed between the fixing plate and the cover board, and the cover board may be fixed on the fixing plate. The cover board may be transparent.

In the present disclosure, by providing a fixing plate and a cover board, setting the cover board to be transparent, disposing the identification mark between the fixed board and the cover board, and fixing the cover board on the fixing board, a user may not only view the identification mark through the cover board, but also prevent the identification mark from being exposed to the wind and the sun to protect the identification mark, and prevent the identification mark from being artificially damaged, solving the technical problem that in the conventional technologies: since the identification mark is stuck on the surface of the body of the bicycle, the identification mark is easy to fall off after being exposed to the wind, the sun, and the rain, and sometimes the identification mark may be vandalized, thereby affecting the user's access of the bicycle sharing service.

In order to better understand the technical solution described above, the technical solution will be described in detail below with reference to the drawings and specific embodiments.

In order to solve the technical problem that in the conventional technologies, that is, since the identification mark is stuck on the surface of the body of the bicycle, the identification mark is easy to fall off after being exposed to the wind, the sun, and the rain, and sometimes the identification mark may be vandalized, thereby affecting the user's access of the bicycle sharing service, some embodiments of the present disclosure provide a fixed structure of an identification mark of a bicycle.

Figure 1:
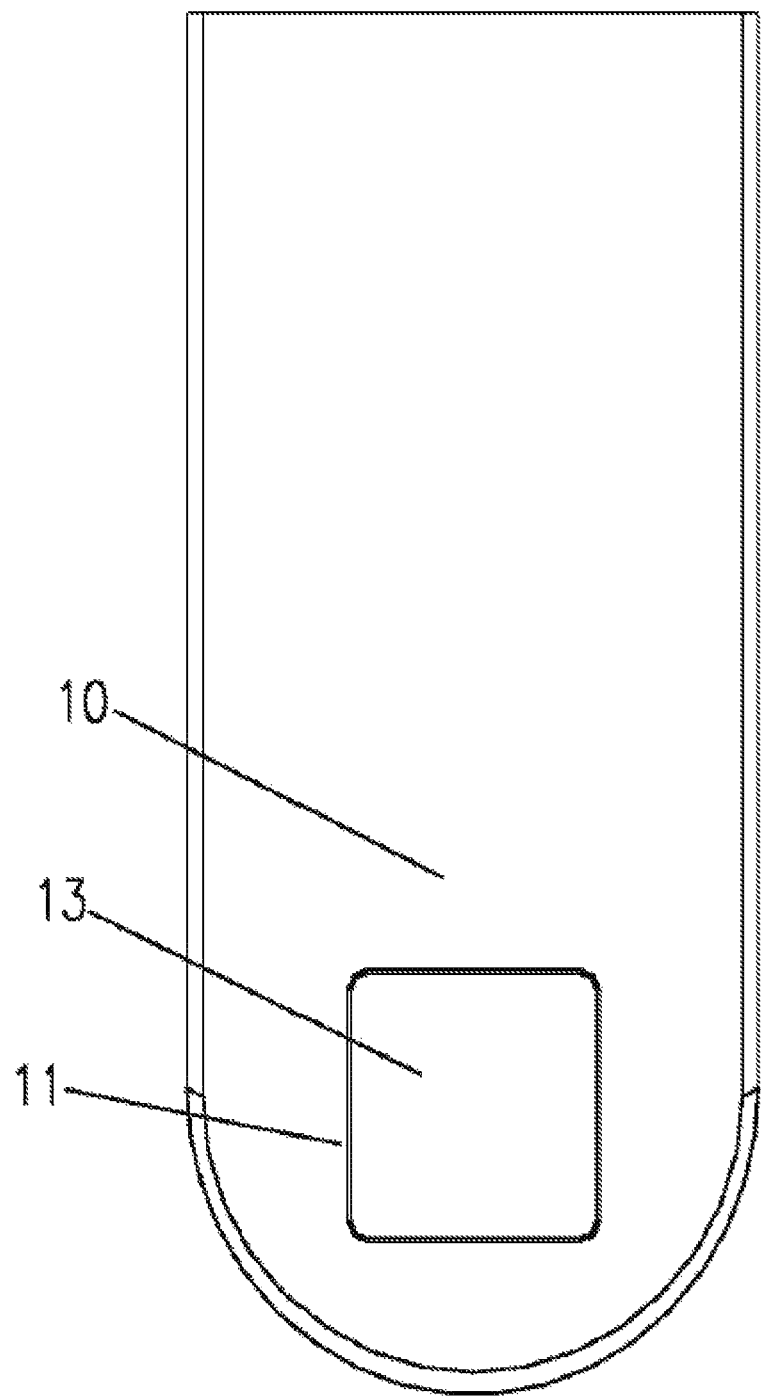
FIG. 1 is a front view of a fixed structure of an identification mark of a bicycle according to some embodiments of the present disclosure.
Figure 2:
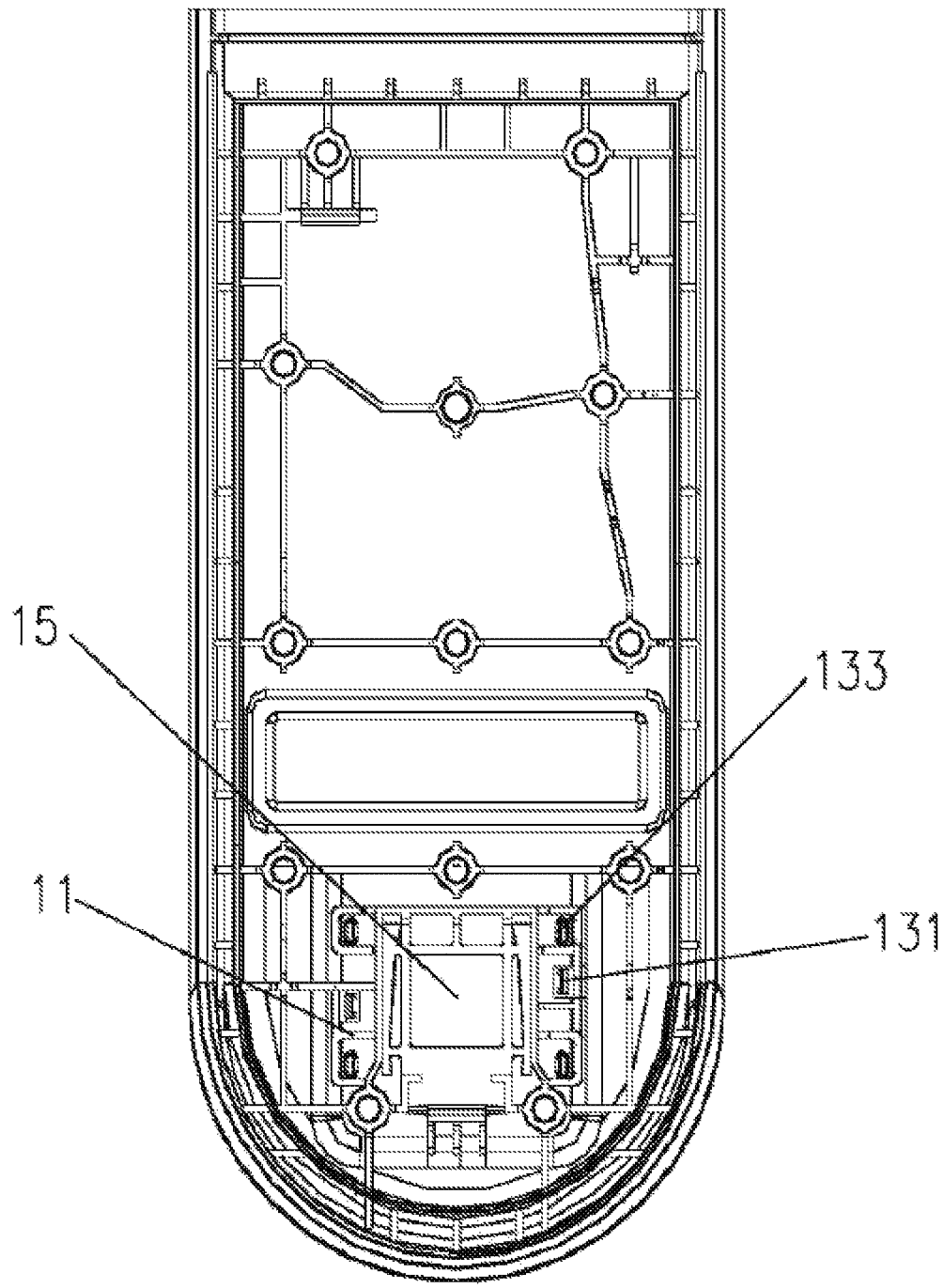
FIG. 2 is a bottom view of the fixed structure of the identification mark illustrated in FIG. 1.
Figure 3:
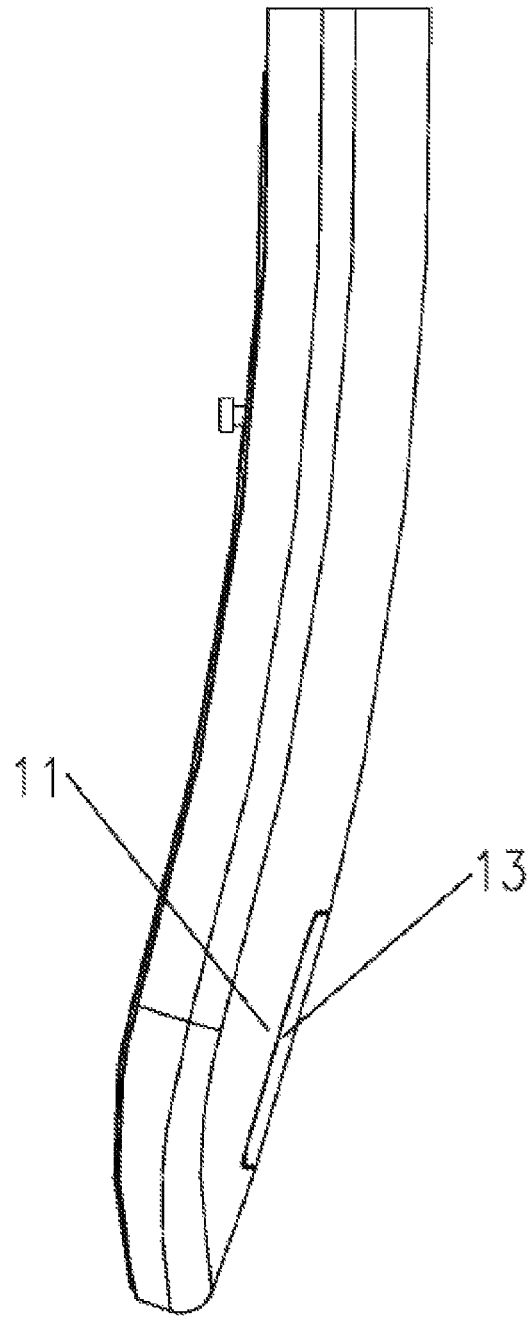
FIG. 3 is a side view of the fixed structure of the identification mark illustrated in FIG. 1.

As shown in FIGS. 1, 2 and 3, the fixed structure of the identification mark of the bicycle may be placed on the body of the bicycle, such as a frame, a fender, or the like. In some embodiments, the fixed structure may be disposed on the fender. In some embodiments, the fixed structure may be set according to a location of the identification mark.

Figure 4:
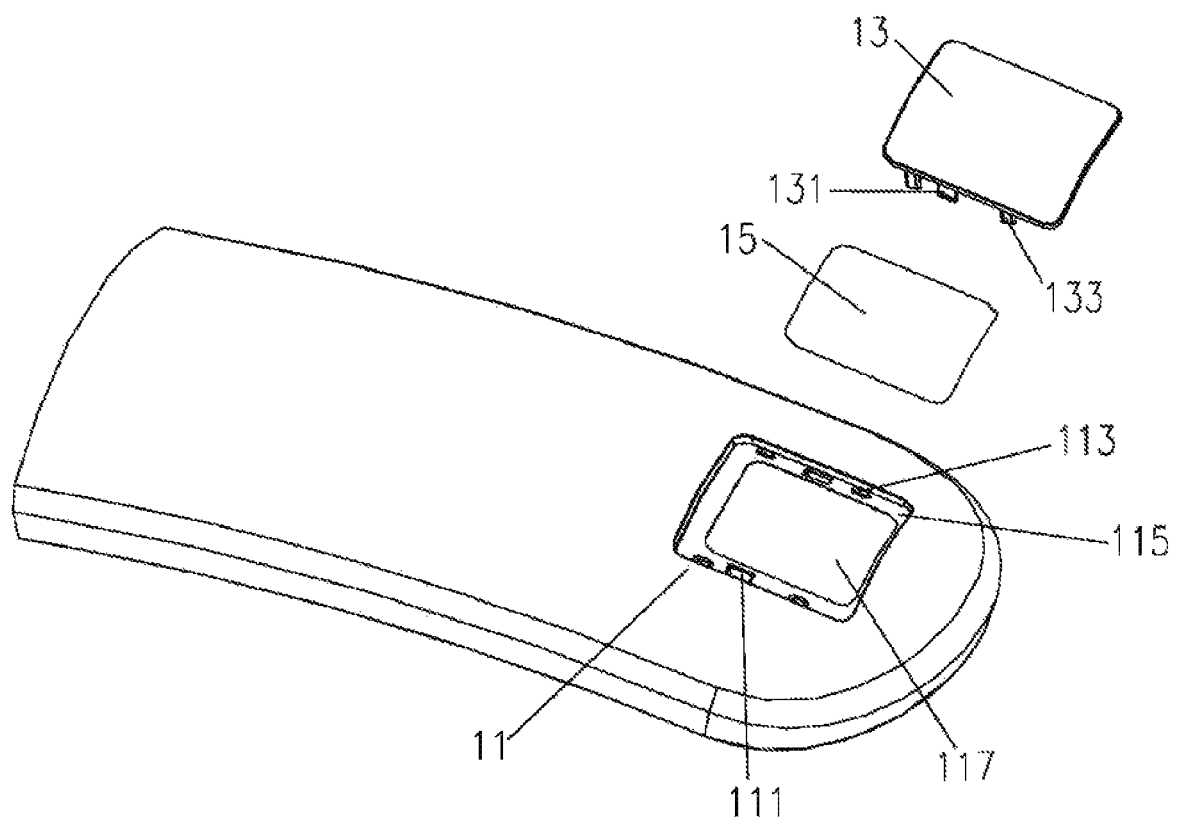
FIG. 4 is an exploded view of the fixed structure of the identification mark illustrated in FIG. 1.

As shown in FIG. 4, the fixed structure 10 may include a fixing plate 11 and a cover board 13. The identification mark 15 may be disposed between the fixing plate 11 and the cover board 13. The cover board 13 may be fixed on the fixing plate 11. The cover board 13 may be transparent. Specifically, the transparency of the cover board 13 may satisfy a preset value, so that a user can view the identification mark through the cover board 13. The identification mark may be an identification code of the bicycle, a two-dimensional code of the bicycle, etc., which is an identifier for identifying the bicycle.

In some embodiments, the fixing plate 11 may be a part of the fender. In some embodiments, if the fixed structure 10 is disposed on the frame, the fixing plate 11 may be a part of the frame.

Specifically, the cover board 13 may be fixed to the fixing plate 11 by at least one of the following manners.

In some embodiments, a buckle may be set on one of the fixing plate 11 and the cover board 13, and a slot may be set on the other one of the fixing plate 11 and the cover board 13. The fixing plate 11 and the cover board 13 may be fixed together by putting the buckle into the slot.

A detailed description will be given below with an example in which a slot 111 is disposed on the fixing plate 11 and a buckle 131 is disposed on the cover board 13.

As shown in FIG. 4, the fixing plate 11 is set with a slot 111, and a surface of the cover board 13 opposite to the fixing plate 11 is set with a buckle 131. After the identification mark is disposed between the fixing plate 11 and the cover board 13, the buckle 131 may be disposed into the slot 111, and thus the cover board 13 may be fixed on the fixing plate 11.

Specifically, in some embodiments, the number of the buckles 131 may be two, and the buckles 131 may be respectively disposed in the middle of two edges on the surface of the cover board 13 opposite to the fixing plate 11. Correspondingly, the number of the slots 111 may also be two, and the positions of the slots 111 may correspond to the positions of the buckles 131.

In addition, in some embodiments, the cover board 13 may be set with a positioning column 133, and the fixing plate 11 may be set with a positioning hole 113. The position of the positioning column 133 may correspond to the location of the positioning hole 113. The positioning column 133 may be fixed within the positioning hole 113. Specifically, in some embodiments, the number of the positioning column 133 may be four, and the positioning columns 133 may be respectively disposed on two sides of the buckle 131.

Specifically, in order to avoid protruding from the fixing plate 11 when the cover board 13 is fixed to the fixing plate 11, the fixing plate 11 is set with a counterbore 115 for accommodating the cover board 13. The shape of the counterbore 115 may correspond to the shape of the cover board 13. The depth of the counterbore 115 may be equal to the thickness of the cover board 13. Thus, when the cover board 13 is fixed to the fixing plate 11, the cover board 13 may be disposed within the counterbore 115, and will not protrude from the fixing plate 11.

Further, the fixing plate 11 may be further set with a through hole 117 connected to the counterbore 115. The size of the through hole 117 may be less than the size of the counterbore 115.

In some embodiments, in order to fix the fixing plate 11 and the cover board 13 together more stably, after the buckle 131 is disposed in the slot 111, adhesive may be used to bond between the buckle 131 and the slot 111, so that the fixing plate 11 and the cover board 13 can be fixed more firmly.

In the present disclosure, by providing a fixing plate and a cover board, setting the cover board to be transparent, disposing the identification mark between the fixed board and the cover board, and fixing the cover board on the fixing board, a user may not only view the identification mark through the cover board, but also prevent the identification mark from being exposed to the wind and the sun to protect the identification mark, and prevent the identification mark from being artificially damaged, solving the technical problem that in the conventional technologies: since the identification mark is stuck on the surface of the body of the bicycle, the identification mark is easy to fall off after being exposed to the wind, the sun, and the rain, and sometimes the identification mark may be vandalized, thereby affecting the user's access of the bicycle sharing service.

Although preferred embodiments of the application have been described, those skilled in the art can make additional variations and/or modifications to these embodiments, once they understand the basic creative concept. Therefore, the appended claims are intended to include the preferred embodiments and all variations and modifications that fall within the scope of this application.

It will be apparent to those skilled in the art that various modifications and variations can be made in this application without departing from the spirit or scope of this application. Thus, if the various modifications and variations to this application are within the scope of the claim of this application and equivalents thereof, this application may be intended to include such variations and modifications.

What is claimed is:

1. A fixed structure of an identification mark of a bicycle, the fixed structure comprising a fixing plate and a transparent cover board, the identification mark being disposed between the fixing plate and the cover board, and the cover board set with a positioning column being fixed on the fixing plate set with a positioning hole, wherein a location of the positioning column corresponds to a location of the positioning hole, and the positioning column is fixed within the positioning hole.

2. The fixed structure of claim 1, wherein the fixed structure is disposed on a fender of the bicycle.

3. The fixed structure of claim 1, wherein one of the fixing plate and the cover board is set with a buckle, and the other one of the fixing plate and the cover board is set with a slot, wherein the fixing plate and the cover board are fixed together by putting the buckle into the slot.

4. The fixed structure of claim 3, wherein the slot is disposed on the fixing plate, and the buckle is disposed on the cover board.

5. The fixed structure of claim 4, wherein the number of the buckles is two, and the buckles are respectively disposed in the middle of two edges on a surface of the cover board opposite to the fixing plate; and the number of the slots is also two, and positions of the slots correspond to positions of the buckles.

6. The fixed structure of claim 5, wherein after the buckle is disposed in the slot, adhesive is used to bond between the buckle and the slot.

7. The fixed structure of claim 1, wherein the number of the positioning columns is four, and the positioning columns are disposed on two sides of the card buckle.

8. The fixed structure of claim 1, wherein the fixing plate is set with a counterbore, and the cover board is disposed within the counterbore.

9. The fixed structure of claim 8, wherein the fixing plate is set with a through hole connected to the counterbore, and a size of the through hole is less than a size of the counterbore.

10. The fixed structure of claim 8, wherein a shape of the counterbore corresponds to a shape of the cover board.

11. The fixed structure of claim 8, wherein a depth of the counterbore is equal to a thickness of the cover board.

12. The fixed structure of claim 1, wherein the identification mark is an identification code of the bicycle or a two-dimensional code of the bicycle.

13. The fixed structure of claim 1, wherein the transparency of the cover board satisfies a preset value.

14. The fixed structure of claim 1, wherein the fixed structure is disposed on a frame of the bicycle.

* * * * *